Jan. 6, 1970  S. S. MELIN  3,487,527
TIRE STUDDER
Filed March 6, 1967  11 Sheets-Sheet 1

INVENTOR.
STEN S. MELIN
BY

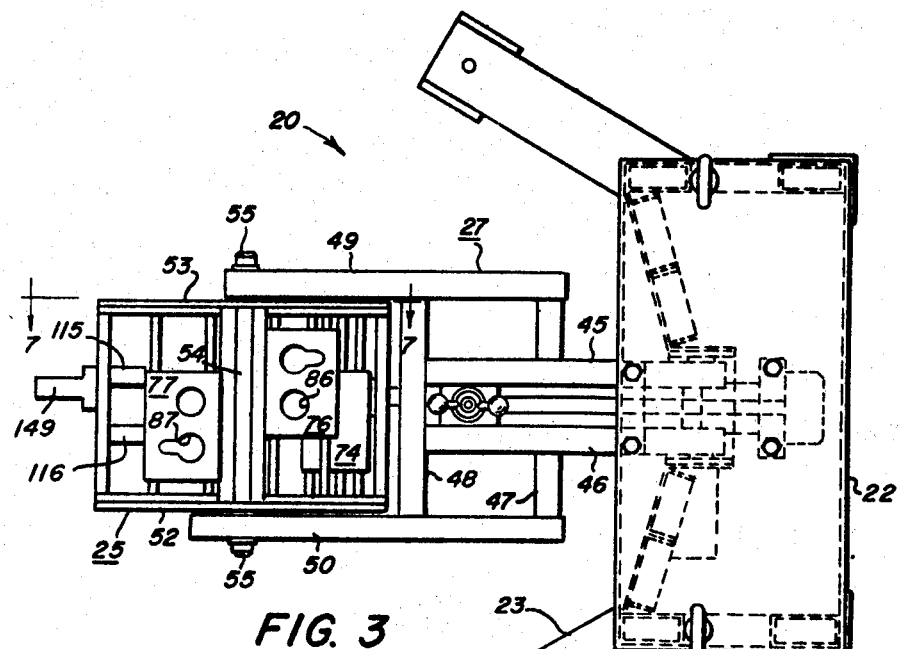
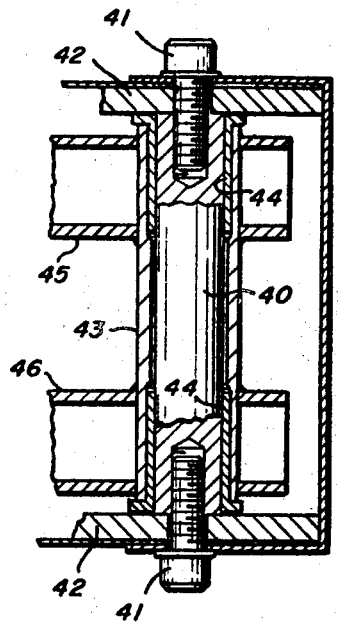
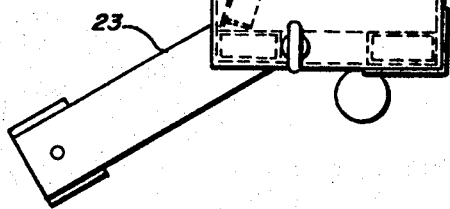
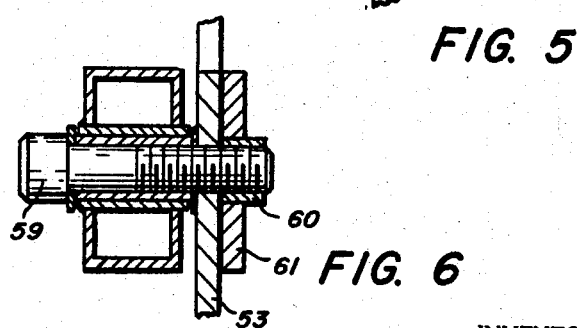
FIG. 3
FIG. 4
FIG. 5
FIG. 6
INVENTOR.
STEN S. MELIN

INVENTOR
STEN S. MELIN

Jan. 6, 1970　　　　　S. S. MELIN　　　　　3,487,527
TIRE STUDDER

Filed March 6, 1967　　　　　　　　　　　　　　11 Sheets-Sheet 8

INVENTOR
STEN S. MELIN

Jan. 6, 1970  S. S. MELIN  3,487,527
TIRE STUDDER

Filed March 6, 1967  11 Sheets-Sheet 9

INVENTOR
STEN S. MELIN
BY
Woodling Krost Granger + Krost
Attys.

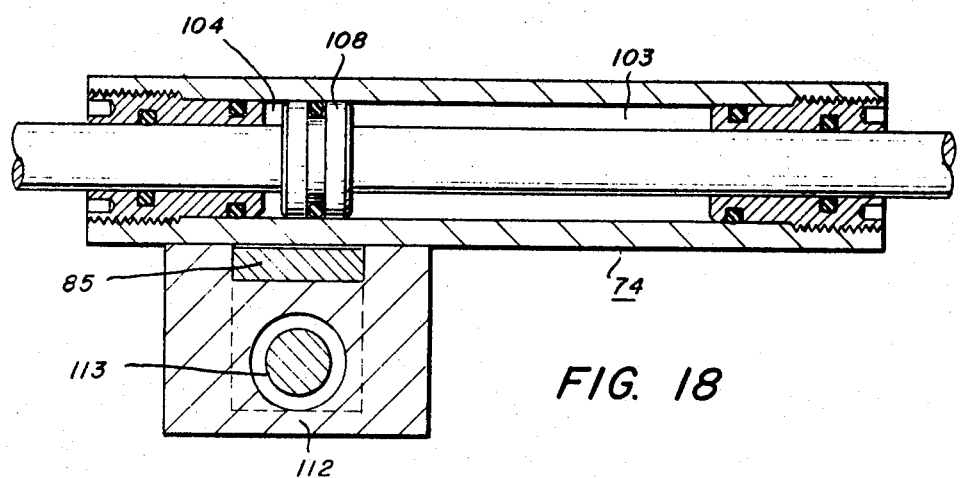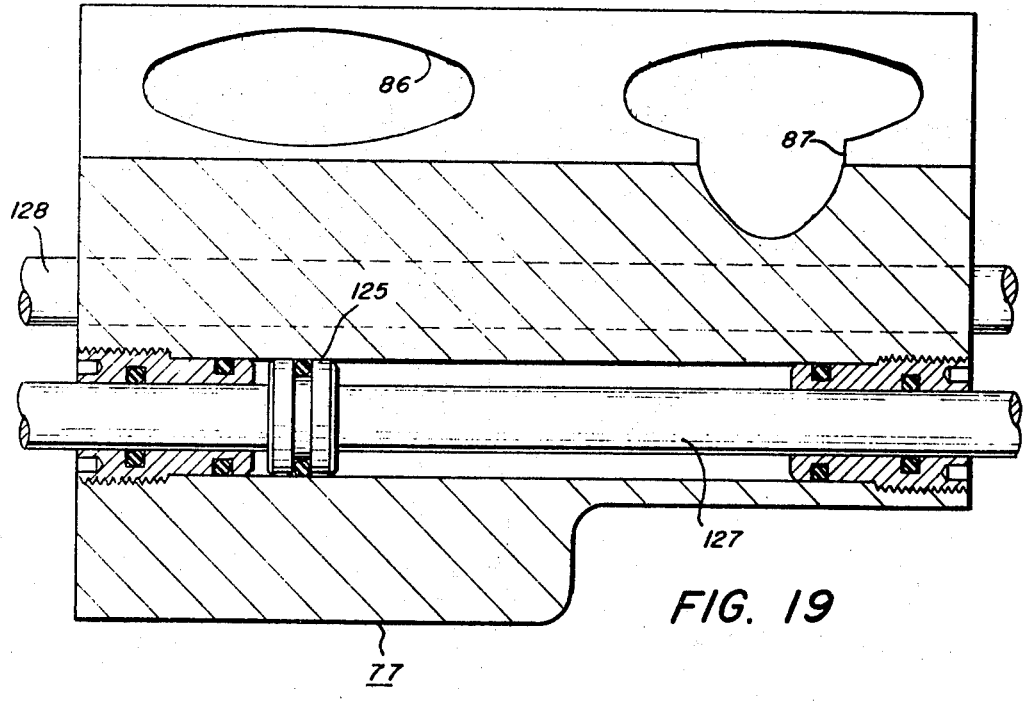

United States Patent Office 3,487,527
Patented Jan. 6, 1970

3,487,527
TIRE STUDDER
Sten S. Melin, 1666 Oakham Road,
Euclid, Ohio 44117
Filed Mar. 6, 1967, Ser. No. 620,842
Int. Cl. B23p 19/04; B23q 7/10
U.S. Cl. 29—208
11 Claims

ABSTRACT OF THE DISCLOSURE

An apparatus or machine for rotatively supporting a vehicle tire and rotatively indexing the tire to various angular positions whereat holes are drilled in given lugs on both the whitewall and blackwall sides of the tire and after drilling, stud mechanisms are moved into positions over the holes and metal studs are inserted into the holes. The machine also has means for adjustably locating the drill and stud mechanisms on the whitewall side of the tire relative to the blackwall side to take care of designed misalignment between corresponding lugs on opposed sides of the tire.

The present invention relates to apparatus for automatically applying studs to the tread of vehicle tires. The prior art has dealt with this problem primarily by having a workman insert the studs individually into preformed holes in the tire tread.

The present invention may be summarized by stating that the apparatus is capable of automatically studding a vehicle tire and includes a unique mechanism for indexing a tire to various angular positions. The apparatus also carries drilling and studding devices on both the blackwall and whitewall sides of the tire to initially drill a hole in the tire tread and then insert a stud thereinto. Adjustment means are provided to shift the drilling and studding devices on one side relative to the devices on the other side to adjust for designed misalignment between corresponding lugs on opposite sides of the tire tread. The apparatus also includes a means for selectively shifting the drilling and studding devices on opposite sides axially with respect to each other.

The vehicle tire industry has developed to a rather popular degree commercially, the use of metal objects, generally referred to as tire studs, in the tread of vehicle tires to facilitate traction particularly on snowy and icy roads. It is the general practice in the industry to preform (during the tire curing operation) holes in the tire treads to receive the studs. The studs are then individually inserted into these preformed holes by a workman utilizing a hand gun, which must precisely find these individual holes, and then usually by means of an air actuated plunger a stud is forced into a given hole.

Without more it will be readily apparent that this involves many disadvantages. One of the major disadvantages is the time required to stud a tire with the resultant high cost to the ultimate user of the tire. For the sake of example, it may take a workman on the order of eight minutes to stud an average sized passenger car tire if he is relieved often enough to eliminate his normal fatigue.

Another disadvantage has to do with operator inaccuracies in inserting the studs as well as the possibility of completely missing given holes. A still further disadvantage to the manufacturer is the upkeep on molds to preform the stud holes.

It is therefore an object of this invention to provide an apparatus for rapidly, economically and accurately applying studs to the tread of vehicle tires. For the sake of example, an operator of the present apparatus which utilizes a single spindle, can stud a tire on the order of two minutes on a consistent basis and with a multiple spindle machine can stud several tires in approximately the same time interval. The present apparatus has the advantage of being able to use tires without preformed holes, by the apparatus drilling its own hole in the tread into which the stud is subsequently inserted.

Another object of the present invention is to provide a tire studding apparatus which does away with operator error and which repeats the studding operation with consistent results.

Another object of the present invention is to provide a tire studding apparatus which involves a new and novel means for rotatively indexing a tire relative to a studding head regardless of whether the studding operation is being accomplished by drilling the stud holes or by finding preformed holes in the tire tread. In either event the operation is broadly referred to as studding and the mechanism as studding means.

Another object of the present invention is to provide a tire studding apparatus which includes tool carriages each carrying drill and studding mechanism with means for indexing the tool carriages outwardly and inwardly relative to each other to provide the studs in a circumferentially out of line pattern around the tire.

Another object of the present invention is to provide a tire studding apparatus having first and second tool carriages each of which carries mechanism for applying studs to opposed lugs on opposite sides of the tire tread periphery, which lugs are designed to be slightly out of axial alignment, with a sensing or adjusting means for slightly shifting one of the tool carriages to accommodate the lug misalignment.

Another object of the present invention is to provide an accurate means for locating the tool slides which carry the studding mechanism, relative to the tire tread.

Another object of the present invention is to provide an accurate and reliable mechanism for providing the drilling of the stud holes as well as the insertion of the studs.

Other objects and a fuller understanding of this invention may be had by referring to the following description and claims, taken in conjunction with the accompanying drawings, in which:

FIGURE 3 is a plan view of FIGURE 1;

FIGURE 4 is an enlarged fragmentary view taken generally along both the lines 4—4 of FIGURE 1;

FIGURES 5 and 6 are enlarged fragmentary views of portions of the structure shown in FIGURE 2;

FIGURE 10 is a fragmentary view for completing the left portion of FIGURE 7 as shown;

Figure 8:
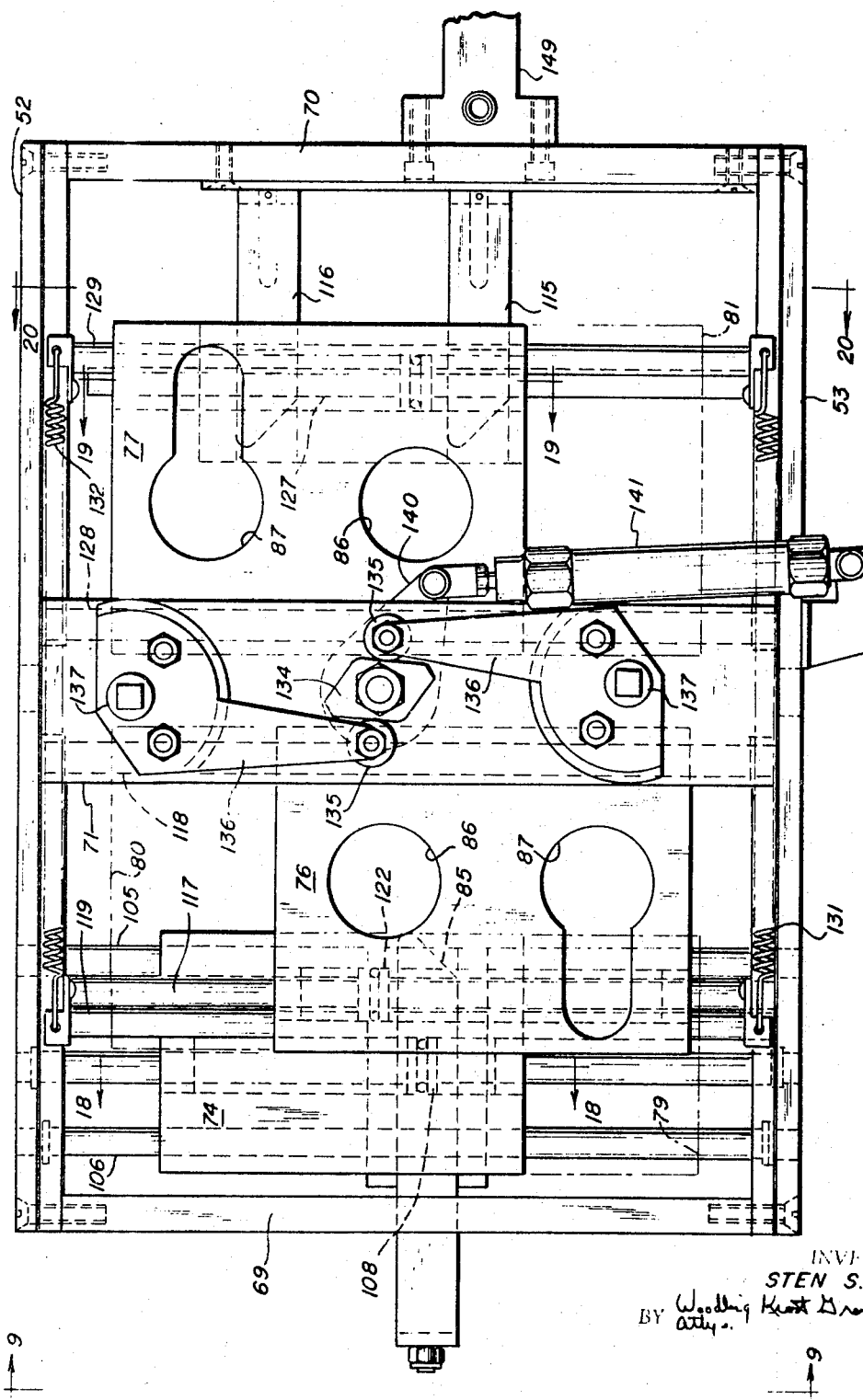
FIGURE 8 is a view taken generally along the line 8—8 of FIGURE 7.
Figure 9:
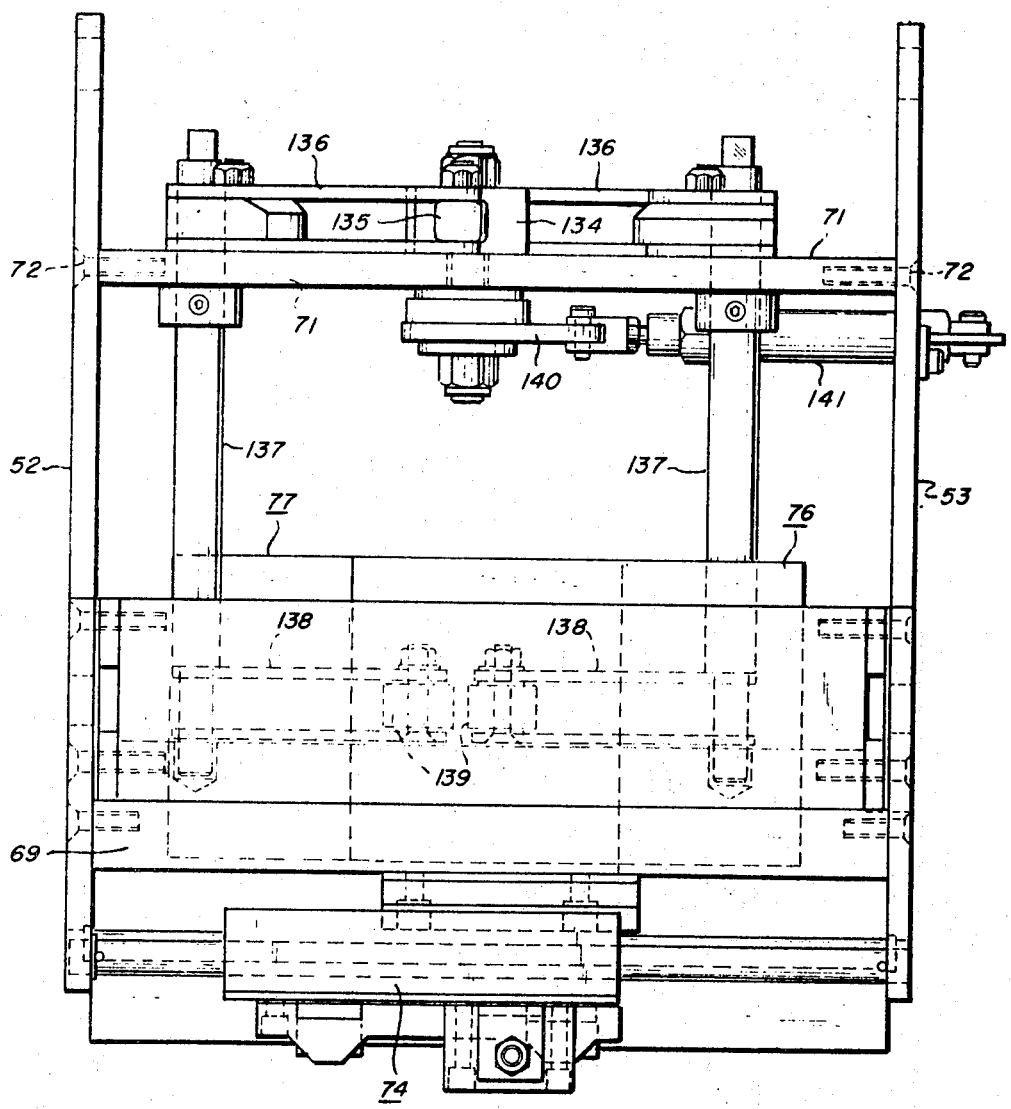
FIGURE 9 is a view taken generally along the line 9—9 of FIGURE 8.
Figure 14:
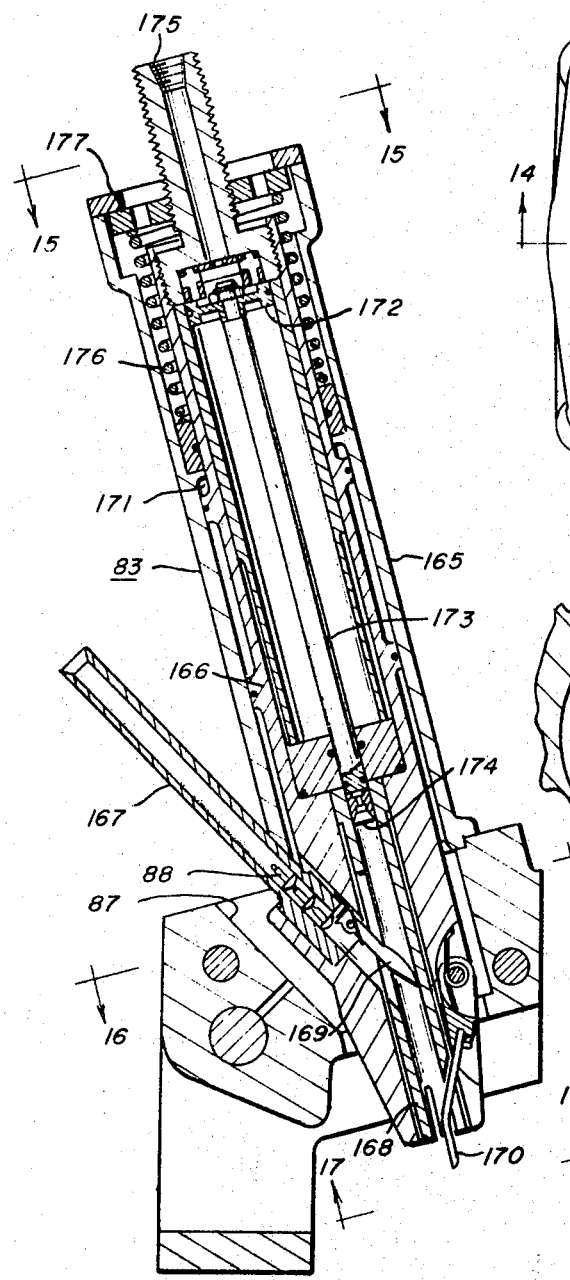
FIGURE 14 is an enlarged elevational view in section showing the studding unit illustrated generally in FIGURES 1 and 7.
Figure 15:
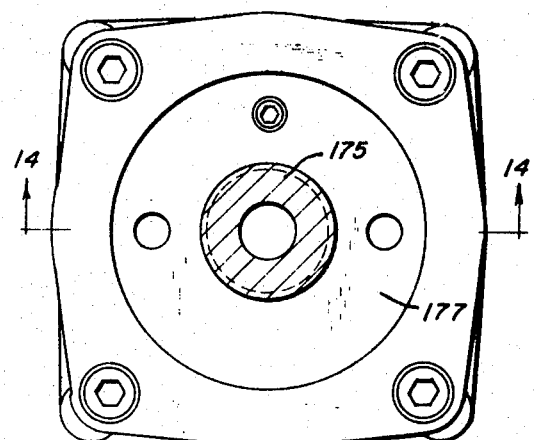
Figure 16:
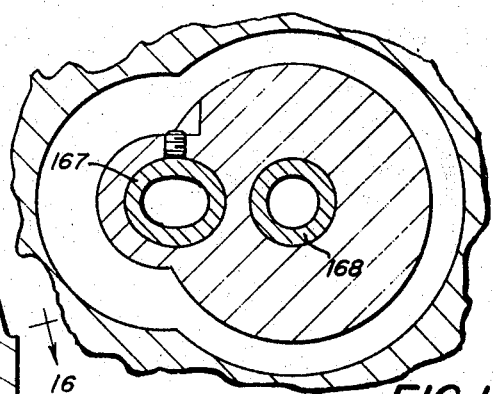
Figure 17:
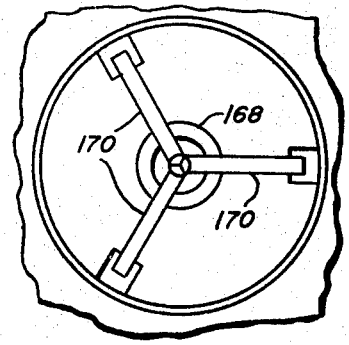
Figure 20:
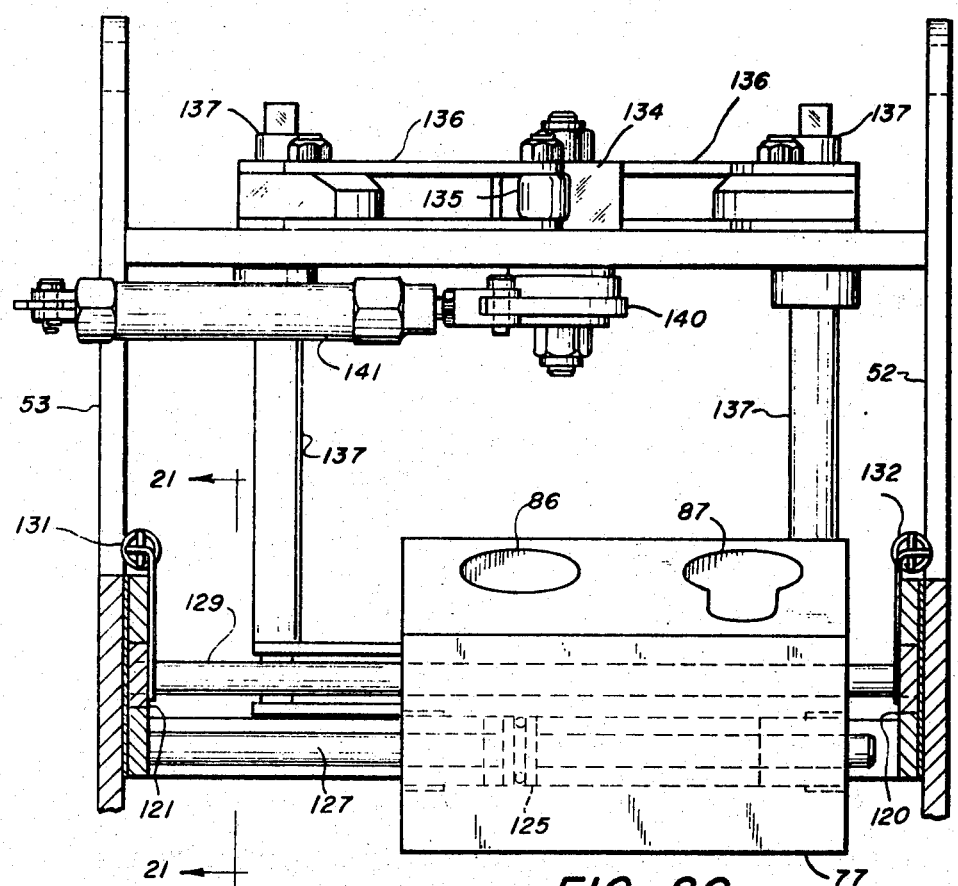

FIGURES 15, 16 and 17 are sectional views taken respectively along the lines 15—15, 16—16, and 17—17 of FIGURE 14;

FIGURES 18 and 19 are sectional views taken respectively along the lines 18—18 and 19—19 of FIGURE 8;

FIGURE 20 is a view taken generally along the line 20—20 of FIGURE 8; and

Figure 21:
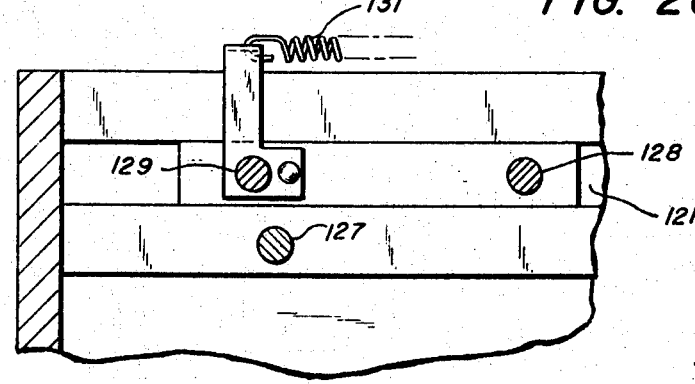

FIGURE 21 is a view taken generally along the line 21—21 of FIGURE 20.

Figure 1:
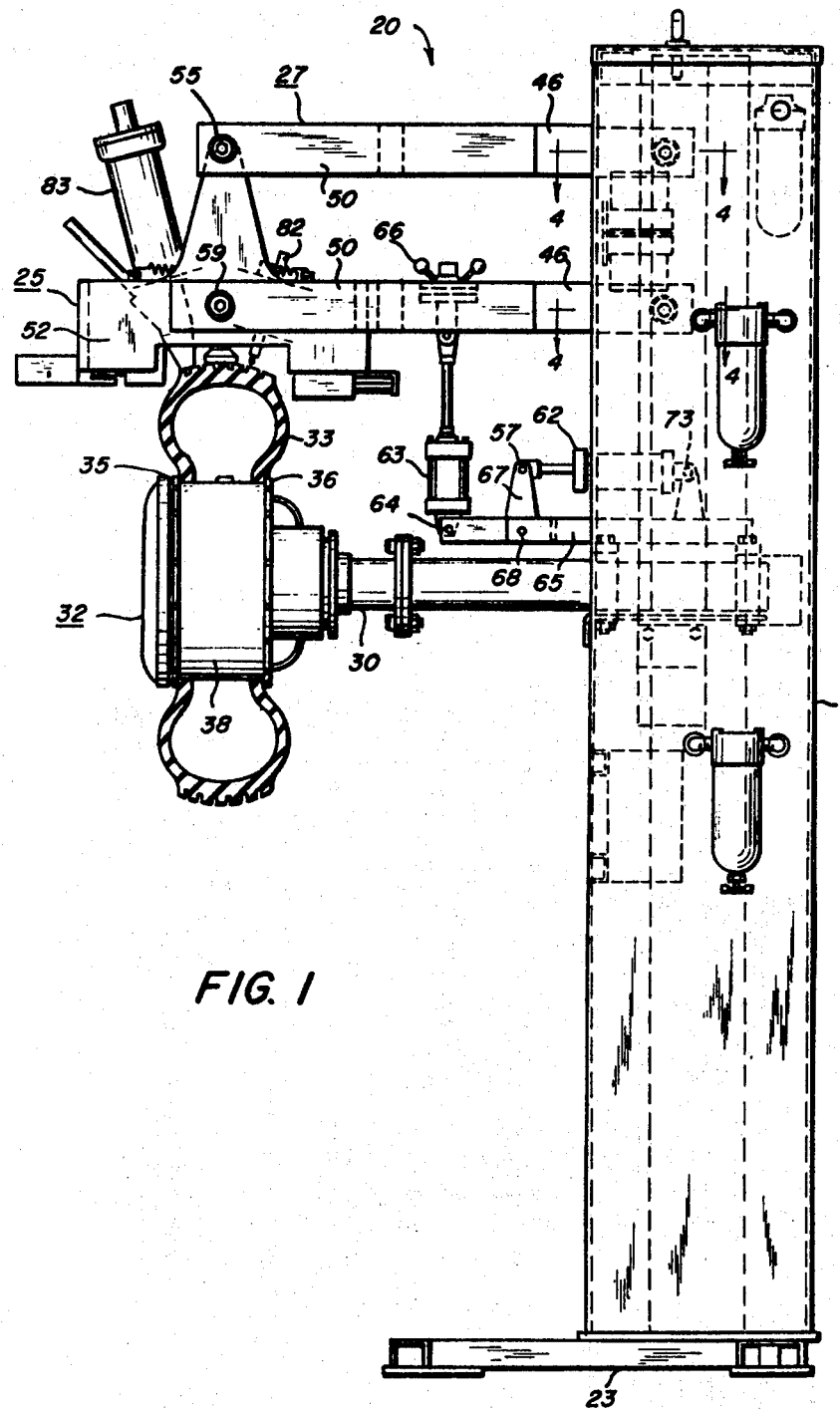
FIGURE 1 is a side elevational view of the tire studder of the present invention.
Figure 2:
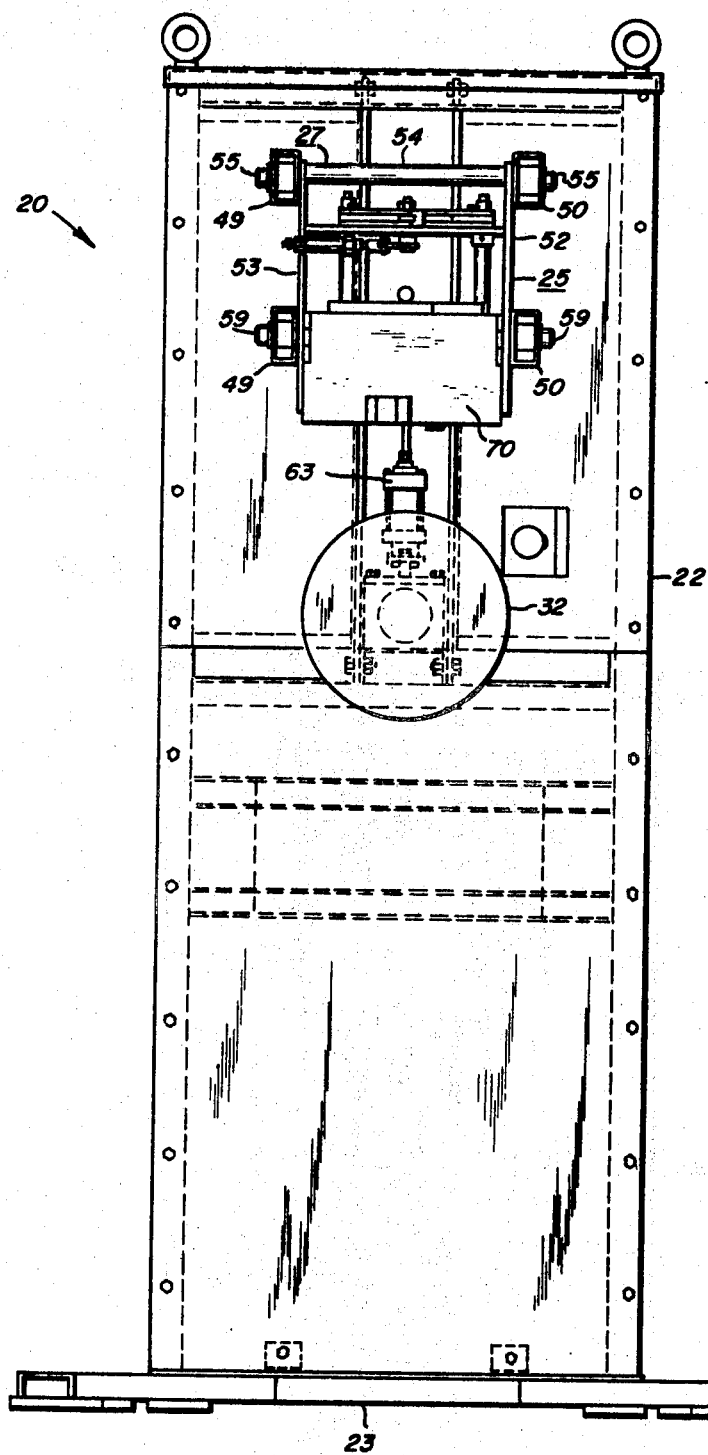
FIGURE 2 is an elevational view taken from the left end of FIGURE 1.

The tire studder of the present invention has been indicated generally by the reference numeral 20 and the overall structure of the studder is best seen in FIGURES 1, 2 and 3. The tire studder includes a generally vertically extending frame 22 which extends from a generally horizontally disposed base 23. An operating head 25 is suspended from the frame 22 by a suspension assembly 27 and the head 25 includes the means for rotatably indexing a vehicle tire to various angular positions as well as carrying the means for drilling holes in the tread of the tire at the places where studs are to be positioned as well as physically placing the studs. The detailed description of this structure will be discussed hereinafter.

Tire mounting means are also supported by the frame 22 and in this particular embodiment of the tire studder, are located below the operating head 25. The tire mounting means includes a generally horizontally disposed spindle 30 rotatably carried on bearings in the frame 22. An expandable wheel 32 is rotatably carried on the spindle 30 and the general construction of this wheel is known to those skilled in the art and a detailed discussion of the mechanical features of the same will not be discussed herein. It is sufficient to say that a tire 33, in position to have studs applied thereto, occupies the position on the wheel 32 shown in FIGURES 1 and 7 and it will be seen that the wheel includes rim portions 35 and 36 and also a radially expandable rubber bladder 38 which is expandable to seal the open portion of the tire around the rim. Means are also provided to inflate the tire as located upon the wheel so as to generally cause the tire to conform to its normal operative shape as utilized on a vehicle. Specifically in this apparatus shown, the inflation pressure is 18 p.s.i. The spindle 30 and wheel 32 are normally freely rotatable.

The suspension assembly 27 which is utilized to suspend the operating head 25 from the frame 22 will next be described and FIGURES 4, 5 and 6 include a detailed showing which will aid in understanding this particular structure. The suspension assembly includes a pivot member 40 held in a fixed position in the frame 22 by means of screws 41 extending through mounting plates 42 and into either end of the pivot member 40. A rotatable member 43 surrounds the pivot member 40 and engages bearing members 44 so as to turn freely thereon. Support members 45 and 46 are fixedly secured to the rotatable member 43 and extend outwardly of the frame where they meet cross members 47 and 48 (FIGURE 3) which are fixedly secured thereto. Secured to the cross members 47 and 48 at opposed ends thereof are two additional support members 49 and 50 which continue in a direction away from the frame 22 and are secured at their outboard ends to side plates 52 and 53 of the operating head 25. The means of connecting the members 49 and 50 are best seen in FIGURE 5. It will be seen that a cross member 54 extends between the side plates 52 and 53 and bolts 55 extend through the ends of support members 49 and 50 and are threadably secured to opposed ends of the cross member 54. These ends of the support members 49 and 50 are adapted to pivot about bearing members 58 held in position by the bolts 55. The suspension assembly 27 includes both an upper and lower portion and corresponding support members of both the upper end lower portions have been identically identified. The ends of support members 49 and 50 on the lower portion of the suspension assembly are connected to the side plates 52 and 53 in a slightly different manner in this construction, as shown in FIGURE 6. In this construction the cross member 54 is missing and in place of this construction the bolts 59 extend through the side plates 52 and 53 as seen and are threadably secured to a nut 60 which in turn resides in an opening in a plate 61. As will be seen from viewing FIGURE 1, the suspension assembly forms generally a parallelogram effect which serves to keep the operating head consistently horizontal or in other words consistently disposed with respect to the tread of the tire as the operating head is moved between what will be referred to as operative and inoperative positions or upper and lower positions relative to a tire which is being worked upon. The position of FIGURE 1 shows the operating head in a down or operative position and in an up position or inoperative position, it is moved upwardly only a vary small amount, on the order of ⅜ of an inch. The head 25 is moved between these two positions by means of an air actuated piston and cylinder arrangement 63 which is fixedly secured at an upper end to the frame 22 by a means 66 which permits adjustments to be made within certain limits with regard to the position of the head in its completely up or down position. The lower end is pivotally connected at 64 to an L-shaped member 67 which by way of pivot 68 connects the piston and cylinder arrangement to a beam 65. Another piston and cylinder arrangement 62 is pivotally connected at 57 to the L-shaped member 67 and is pivoted at its other end at 73 to beam 65. The piston and cylinder arrangement 62 is for the purpose of raising the head 25 sufficiently to permit the tire 33 to be placed on and removed from the wheel 32. It will be apparent that if the piston and piston rod of arrangement 62 as viewed in FIGURE 1 are moved to the right, the L-shaped member 67 will pivot about 68 causing the head 25 to raise through the connection of the piston and cylinder arrangement 63.

Figure 7:
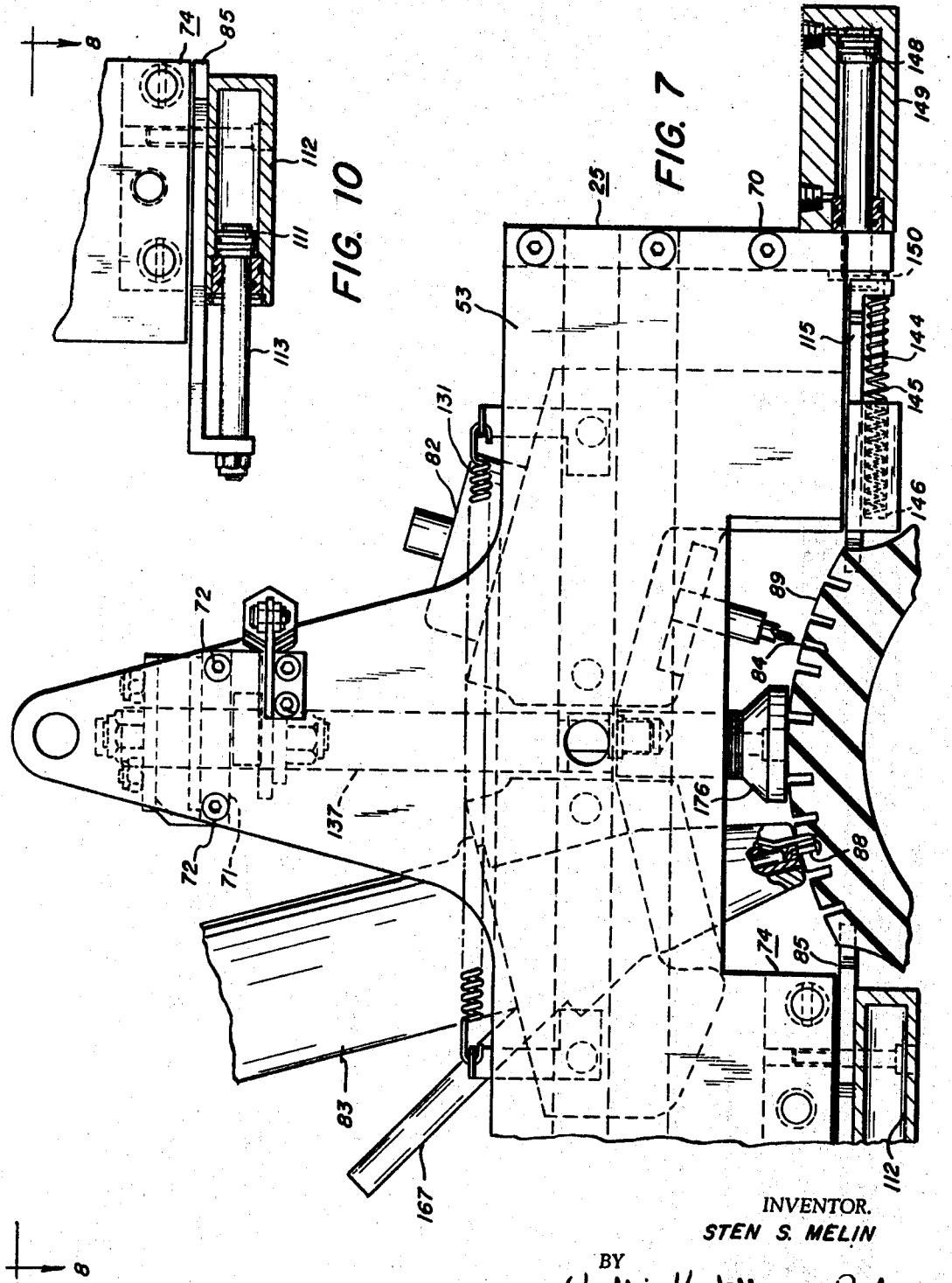
FIGURE 7 is an enlarged view of the operating head of the tire studder taken generally along the line 7—7 of FIGURE 3.

FIGURES 7, 8, 9 and 10 show the details of construction of the operating head 25. It should be observed that FIGURE 7 is in a direction opposite to FIGURE 1. In addition to the side plates 52 and 53 the operating head includes end plates 69 and 70 and a cross support member 71 extends between and is secured to the side plates 52 and 53 by means of screws 72. The operating head includes a feeder or indexing mechanism 74 and first and second tool slides 76 and 77. The feeder mechanism 74 is capable of movement between the full line position shown in FIGURE 8 and the dot-dash position 79 and the tool slides 76 and 77 are capable of movement between the full line positions in which they are shown and the dot-dash positions 80 and 81. Each of the tool slides 76 and 77 carries a drilling unit 82 in opening 86 and a studding unit 83 in opening 87. The drilling and studding units have not been shown in FIGURE 8, only the openings, for more ease in illustration. These units have been shown for example in FIGURES 1 and 7. The tool slides 76 and 77 in the full line position of FIGURE 8 locate the drilling units 82 in the proper position for drilling a hole 84 (see FIGURE 7) into which a stud is to be subsequently located. When the tool slides 76 and 77 are moved to the dot-dash positions 80 and 81 the studding units 83 are located over the position where the drill units 82 were previously located so as to insert studs 88 into the previously located holes. The tire which is carried on the wheel 32 is rotated into position so as to place a lug on the tire into position for studding by means of the feeder mechanism 74. This mechanism includes a feeder blade 85 carried by the feeder mechanism 74 and capable of being projected into engagement with the lug on a tire. This engagement and movement of the feeder mechanism causes rotation of the wheel 32 and the tire 33 carried thereby.

Figure 11:
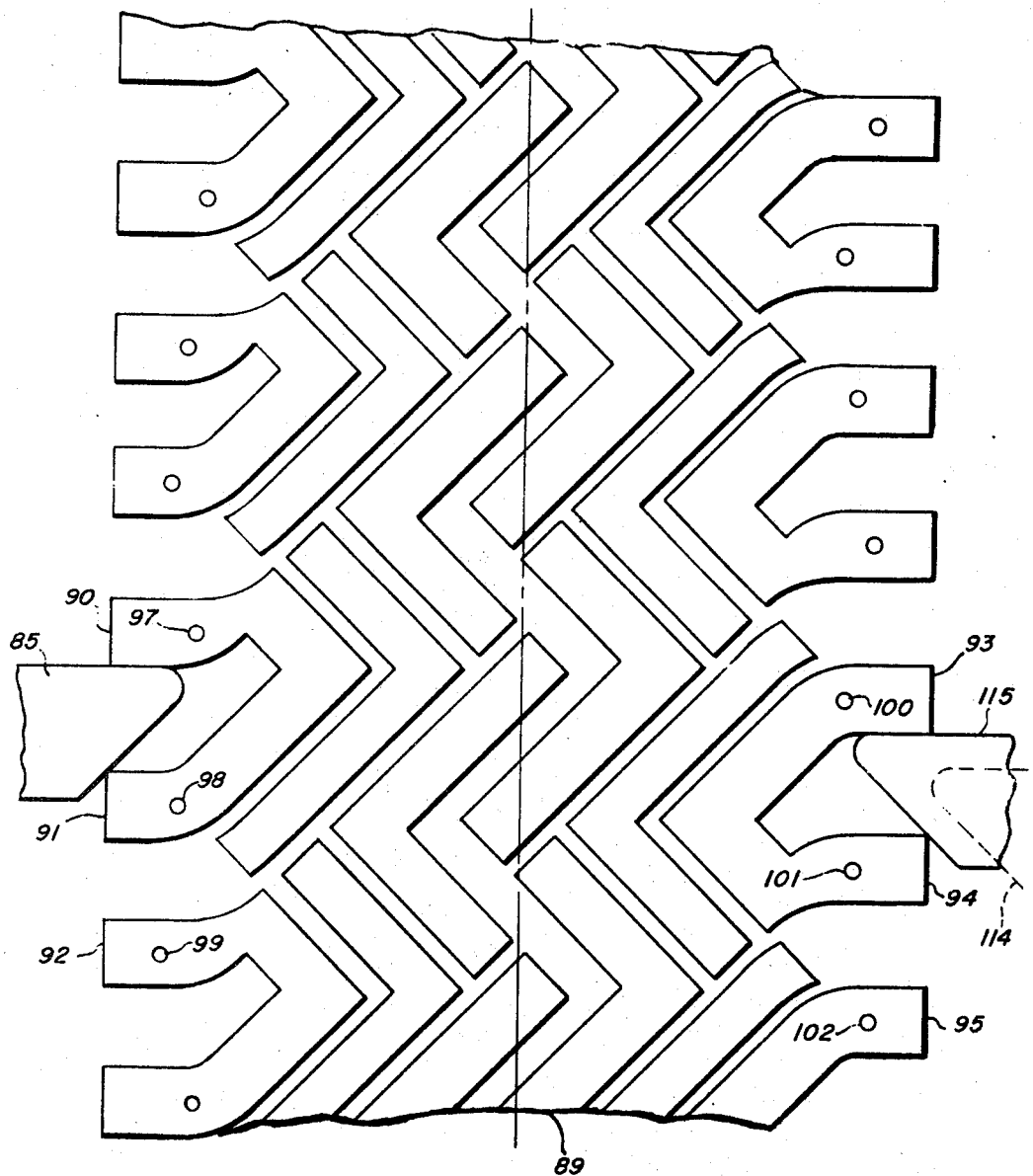
FIGURE 11 is a developed view of a vehicle tire tread to which the studs are to be applied.

In order to aid in an understanding of the studding operation, which the tire studder of the present disclosure accomplishes, reference may be had to FIGURE 11 which is a developed view of a portion of the tire tread 89 which might be that of the tire 33 carried on the wheel 32 of FIGURE 1. As seen in this view, three lugs 90, 91 and 92 have been shown on the left side of the tread and three lugs 93, 94 and 95 have been shown on the right side of the tread. Holes 97, 98 and 99 indicate the stud positions on the lugs 90, 91 and 92 and holes 100, 101 and 102 indicate the stud positions on the lugs 93, 94 and 95. It will be noted that corresponding lugs on the opposed sides of the tread, for example lugs 90 and 93; 91 and 94; and 92 and 95 are circumferentially offset a slight angular distance with respect to each other which is a structural characteristic built into winter tread type of tire designs by the manufacturers thereof. One of the reasons for so designing winter treads in this manner is to attempt to eliminate tire noise particularly when the vehicles are traveling on dry pavement. Since corresponding lugs are offset with respect to each other varying distances at various angular positions around the circumference of the tire, up to a maximum of on the order of ⅞ of an inch to a minimum of essentially no differential, it is necessary to compensate for this differential in the first and second tool slides 76 and 77 so as to assure that the drilling and studding operation is performed in precisely the correct position on the tire lug.

It will also be noted that the holes 97, 98 and 99 are circumferentially out of line with each other as are the holes 100, 101 and 102, on the other side. This circumferential misalignment is designed into the stud positions so as to also aid in the elimination of road noise. For this reason, the first and second tool slides are designed to index laterally outwardly and inwardly with respect to each other as viewed in FIGURE 8. The function performed (FIGURE 8) is that the indexing mechanism 74 by blade 85, rotatively moves the tire to a precise position relative to the operating head 25 which locates the drilling unit which is positioned in opening 86 in tool slide 76 in its full line position directly over hole 97. This positioning of the tire only approximately locates the drilling unit of tool slide 77 over hole 100. This approximate positioning is illustrated in FIGURE 11 by the dotted position 114 of a blade 115 of an adjustment or compensating means which will be described structurally hereinafter but which will only be described functionally at this time. The blade 115 is secured to the tool slide 77 and as a result when it is moved axially it serves to cam itself and the tool slide 77 to which it is attached to a position where the drilling unit 82 which is located in opening 86 of tool slide 77 is located precisely over opening 100. The drilling operation is performed to produce the holes at the positions indicated by holes 97 and 100.

The tool slide 76 is next shifted to the dot-dash position 80 which locates the studding unit 83 of the tool slide precisely over hole 97. Tool slide 77 is also simultaneously shifted to dot-dash position 81 (after blade 115 has been retracted) however the studding unit 83 of this tool slide is not precisely positioned over the hole 100 for the same reason as discussed above in the drilling operation. Another blade 116 is carried by tool slide 77 which is located at the same place in the dot-dash position 81 as blade 115 was in the full line position shown in FIGURE 8 and discussed in conjunction with FIGURE 11. Engagement of blade 116 between lugs 93 and 94 shifts tool slide 77 appropriately to line up the studding unit of this tool slide precisely with hole 100. The studding operation is next performed. The detailed discussion of the structure which accomplishes the functions previously referred to will now be discussed.

The feeder mechanism 74 will be discussed first and this mechanism includes guide rods 105 and 106 which are fixedly secured at either end in the side plates 52 and 53 respectively. A fixed piston 108 (FIGURE 18) has opposed ends which extend between and are secured to the side plates 52 and 53. It will thus be seen than if air under pressure is introduced into the bore within which piston 108 resides on the upper side thereof as seen in FIGURE 8 (chamber 103 in FIGURE 18) that the feeder mechanism will travel to the full line position as shown. If air is exhausted from this side and is introduced into the opposite side (chamber 104 in FIGURE 18), the feeder mechanism will move to the dot-dash position 79. The travel of the feeder mechanism is determined by means of the length of the bore within which the piston 108 is located.

The feeder blade 85 is connected to an air actuated piston 111 by piston rod 113 and piston 111 travels within a cylinder 112. The cylinder 112 is fixedly secured to the feeder mechanism 74 in the manner shown and the feeder blade 85 is extendable from the position of FIGURE 10 to the positions shown in FIGURES 10 and 11 where it is in engagement between lugs 90 and 91 on the tread 89. This engagement is effected at the dot-dash position (FIGURE 8) 79, and the feeder mechanism is then moved to the full line position of FIGURE 8 which precisely locates the lug 90 in position to be subsequently drilled and studded. The feeder mechanism reliably holds the tire in this position.

The tool slides 76 and 77 are essentially of the same construction except that they are opposites of each other. Tool slide 76 includes rods 117, 118 and 119 which extend through bores in the slide. The opposed ends of rods 117, 118 and 119 reside in guideways 120 and 121 which permit travel of the slide 76 in a direction normal to the extent of rods 118 and 119. Rod 117 is formed with a fixed piston 22 and the introduction of pressurized air alternately on either side of this piston will cause the slide 76 to move back and forth between its aforementioned positions. Rods 127, 128 and 129 extend through bores in tool slide 77 and the respective ends of 128 and 129 are also positioned in guideways 120 and 121. Rod 127 is formed with a piston 125 and pressurized air introduced alternately on either side of the piston causes the back and forth movement of slide 77 between the dot-dash position 81 and the full line position of FIGURE 8. See FIGURE 19 for detail. As viewed in FIGURE 20, the left end of rod 127 is located adjacent the member which forms one side of guideway 121 and the right end of rod 127 terminates short of the member which forms one side of guideway 120. This is to permit the adjustment or compensating means to operate to readjust slide 77 as described hereinabove. Springs 131 and 132 are connected at their opposed ends to the tool slides 76 and 77 and exert a force constantly biasing the tool slides toward each other to their extreme inward position in this direction shown in FIGURE 8.

The tool slides 76 and 77 are urged laterally outwardly in guideways 120 and 121 from the full line position of FIGURE 8 (represented also by positions 97 and 100 in FIGURE 11) to positions 98, 101 and 99, 102 by means of a cam 134 which, in this embodiment, is rotatable to three different positions giving the lateral stud positions patterns of FIGURE 11. Cam followers 135 engage the cam 134 and through arms 136 are connected to shafts 137 and rotate the same. The lower ends of the shafts 137 are also provided with arms 138 connected thereto and these arms have rollers 139 on their opposite ends which rollers engage the tool slides 76 and 77. It will be apparent therefore that as cam 134 rotates, tool slides 76 and 77 will be shifted laterally outwardly and inwardly. Rotation of cam 134 is effected by a plate 140 which carries a rachet mechanism (not shown in detail) and the plate 140 is shifted angularly back and forth to operate the rachet mechanism and rotate cam 134 by means of a pneumatic piston and cylinder arrangement 141.

The structure of the adjustment means which includes blades 115 and 116 is as follows. As mentioned before, the blades 115 and 116 are each carried by tool slide 77 and include an extension 144 which extends axially within a spring 145 the other end of which is carried in a recess 146. The springs 145 serve to constantly bias blades 115 and 116 to inoperative position or away from the tire. A piston 148 is located in cylinder 149 which is fixedly secured to the end plate 70 of head 25. The piston has an end portion 150 which is adapted to engage the blades 115 and 116, depending on the position of the tool slide 77, and move the same to operative position as shown in FIGURE 11 (full line position).

Figure 12:
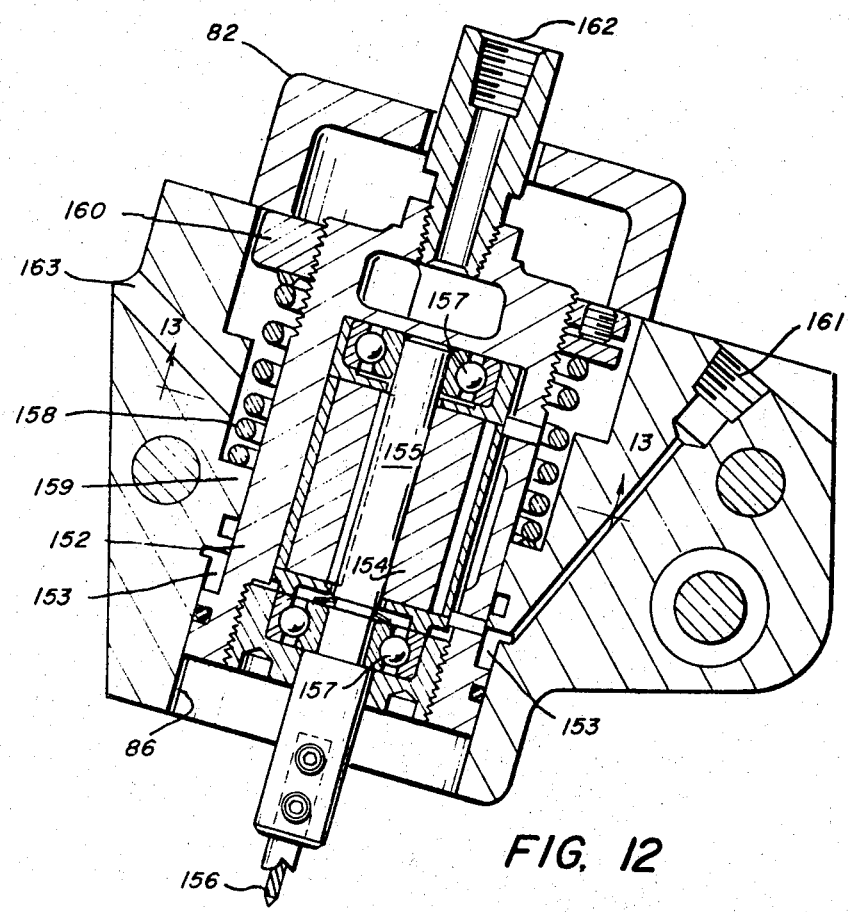
FIGURE 12 is an enlarged elevational view in section showing the drilling unit illustrated generally in FIGURES 1 and 7.
Figure 13:
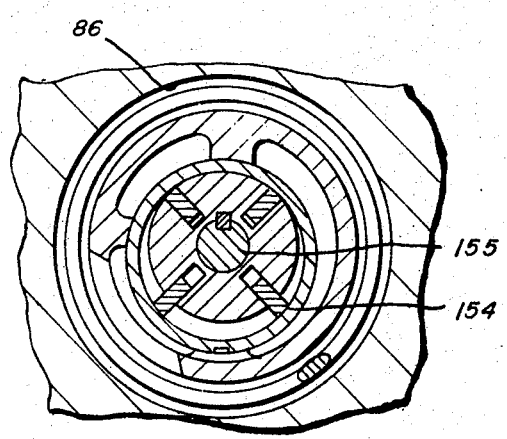
FIGURE 13 is a view taken generally along the line 13—13 of FIGURE 12.

The drilling unit 82 is seen in FIGURES 12 and 13. Two are provided for this machine and are located in openings 86 in tool slides 76 and 77 as mentioned above. Each unit comprises a housing 152 which forms a chamber 153 with the wall of opening 86. A vane type air motor 154 is located in the housing and serves to rotatively drive a shaft 155 which carries a drill 156. The shaft is mounted on bearings 157. A spring 158 bears against a shoulder 159 in opening 86 at one end and at the other end engages a collar 160 which limits return movement of the drilling unit. Forward movement of the unit is caused by the introduction of air under pressure through port 161 to chamber 153. Air to drive the air motor 154 is introduced through port 162 and is exhausted therefrom through port 163.

Each of the studding units 83 which are located within openings 87 comprises a housing 165 fixedly secured to its tool slide and located within the housing is a carriage 166 which is adapted to move back and forth between inoperative and studding positions in a manner similar to a piston in a cylinder. The carriage includes a stud feed tube 167 which empties into a main discharge tube 168. A latch 169 cooperates with tube 167 to allow only one stud 88 into tube 168 at a time. Three guide fingers 170 are located equidistantly around the discharge end of tube 168 and these fingers are for the purpose of finding the holes 84 and guiding the studs 88 as they are being inserted thereinto. A chamber 171 is formed between the inner wall of housing 165 over an outer wall of carriage 166 and when air pressure is introduced thereinto (through a port not shown) the carriage moves downwardly as viewed in FIGURE 14 to studding position as shown in FIGURE 7. Return movement of carriage 166 is effected by a spring 176 which engages housing 165 at one end and a collar 177 connected to carriage 166 at its other end. An ejection piston 172 and rod 173 are located in the carriage 166 and the rod 173 has an end portion 174 to engage the studs and push the same into the holes 84 in the tire tread. The piston 172 is actuated in studding direction by the introduction of air pressure through port 175. The movement of rod 173 in inserting a stud moves latch 169 about its pivotal mounting thus permitting another stud to drop into tube 168 after return of rod 173. Air pressure returns piston 172 but the porting has not been shown. An adjustable foot 176 (FIGURE 7) is carried by the operating head 25 and serves as a positive locating stop to exactly position the drilling and studding units relative to the tire tread prior to each stud being placed.

The control system for actuating each of the functional parts of the present apparatus have not been described and will not be described in detail other than to state that a timer system is provided which controls for example entrance and existing of air pressure into the various air, piston and cylinder arrangements to perform their functions. The following is a description of the sequence of operations in studding a tire with the apparatus disclosed in the present application. These operations can of course be varied within limits by those skilled in the art without department from the invention. Assuming that the apparatus is at rest, the operating head 25 would be in raised position by actuation of the piston and cylinder arrangement 62. A tire 33 would be moved into the position shown in FIGURE 1 and the timer starter button would be initiated. This causes expansion of the wheel 32 which moves the rim portions 35 and 36 and the rubber bladder 38 into the position shown in FIGURE 1 to seal the open portion of the tire. The tire is next inflated to an appropriate pressure with air and in this particular embodiment 18 pounds per square inch. The feeder blade 85 is next moved into engagement between lugs 90 and 91 (FIGURE 11) of the tire tread in the dot-dash position 79 and the feeder mechanism 74 then moves to the full line position of FIGURE 8. Blade 115 is then moved into engagement between the lugs 93 and 94 on the opposite side of the tire tread to shift tool slide 77 to the proper precise position over the lug 93. The operating head 25 is then lowered by piston and cylinder arrangement 63 with foot 176 properly positioning the same and the drill motors 154 are started by the introduction of air pressure through ports 162. The drills 156 are then fed into the tire tread to produce the stud holes at positions 97 and 100 (see FIGURE 11) and the drills are retracted by springs 158. The drills are fed in once more to remove the loose rubber pulp produced during the first pass. The drills are then stopped and the operating head 25 is raised slightly by the air piston and cylinder arrangement 63. Blade 115 is then retracted. Tool carriage 76 is shifted to the dot-dash position 80 and tool carriage 77 is shifted to the dot-dash position 81. This positions the studding unit 83 carried by tool slide 76 precisely over position 97, however, the studding unit 83 of tool slide 77 may be slightly misaligned for the reasons discussed hereinbefore in the drilling operation. The head 25 is next lowered and blade 116 is caused to engage lugs 93 and 94 to re-adjust the position of tool slide 77 and position the studding unit 83 precisely over position 100. The carriage 166 of the studding units are then fed in by the introduction of air pressure into chambers 171 and this causes the fingers 170 to travel into the previously drilled holes. Air is then introduced into ports 175 of the studding units which causes the rods 173 of the ejection pistons to push the studs into position in the holes as shown in FIGURE 7. The rod 173 is then withdrawn and the carriage 166 is next moved back to its in-operative position as shown in FIGURE 14. Blade 116 of the adjustment mechanism is withdrawn and the head 25 is raised by the piston and cylinder arrangement 63. Both tool carriages 76 and 77 are then shifted to the drilling positions or that shown in the full line drawing of FIGURE 8. The feed finger or blade 85 is next retracted and the feeder mechanism 74 is moved to the dot-dash position 79. The feeder blade is next moved to operative position to engage between lugs 91 and 92 and the feeder mechanism is moved back to the full line position of FIGURE 8 to cause the same process to be repeated with the ultimate result of inserting studs at positions 98 and 101 as shown in FIGURE 11. Additionally, during this process, the piston and cylinder arrangement 141 is actuated to move cam 134 and shift the tool slides 76 and 77 laterally away from each other or in an axial direction with respect to the tire shown in FIGURE 11 so as be circumferentially aligned with positions 98 and 101.

After the studs have been placed throughout the complete circumference of the tire the wheel 32 is collapsed and the tire is deflated. The machine is designed to automatically stop when all of the studs have been inserted and the operating head 25 is raised through the action of piston and cylinder arrangement 62 so that the completely studded tire can be removed from the collapsed wheel. The entire process is then repeated.

It will thus be seen that all of the advantages and objects set forth above are conveniently and reliably carried out.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a tire studding apparatus the provision of a mechanism for indexing a tire which has lugs thereon to various rotatable positions including in combination a means for rotatably mounting a tire, an indexing mechanism movable between tire pickup and studding positions, means for moving said indexing mechanism between said tire pickup and studding positions, a projectable member carried by said indexing mechanism and engageable with a tire at said pickup position and adapted to index the tire to a given rotatable position upon movement of said indexing mechanism to said studding position.

2. In a tire studding apparatus as claimed in claim 1, the provision of studding means for inserting a stud into the tire at said studding position.

3. In a tire studding apparatus as claimed in claim 1, wherein the projectable member is engageable with a lug on a tire.

4. Apparatus for applying studs to the tread of tires including in combination a frame (means for rotatably supporting a tire, a head carried by said frame, said head comprising a tool slide carrying a drill and a studder and movable between drilling and studding positions, a tire feeder mechanism carried by said head and movable between first and second positions relative to said head, a member carried by said feeder mechanism and projectable to engage a lug on a tire and when so projected and said tire feeder mechanism moves from said first to said second position the tire is rotated to a new position relative to said head, and means for moving said tool slide to said drilling position to bring said drill into operative relationship with the tire to drill a hole therein and means for moving said tool slide to studding position to bring said studder into operative relationship with the tire to insert a stud into the previously drilled hole.

5. Apparatus as claimed in claim 4 wherein means are provided for raising and lowering said head relative to a tire carried by said means for rotatably supporting the same.

6. Apparatus for applying studs to the tread of tires including in combination a frame, means for rotatably supporting a tire, a head carried by said frame, said head comprising first and second tool slides located on axially opposed sides of a tire supported by said means and each tool slide carrying a drill and a studder and movable between drilling and studding positions, a tire feeder mechanism carried by said head and movable between first and second positions relative to said head, a member carried by said feeder mechanism and projectable to engage a lug on a tire and when so projected and said tire feeder mechanism moves from said first to said second position the tire is rotated to a new position relative to said head, and means for moving each of said tool slides to said drilling positions to bring said drills into operative relationship with the tire to drill holes therein, and means for moving each of said tool slides to said studding positions to bring said studders into operative relationship with the tire to insert studs into the previously drilled holes.

7. Apparatus as claimed in claim 6, wherein means are provided for laterally shifting said first and second tool slides with respect to each other in the axial direction of a tire being handled thereby to axially vary the pattern of the studs.

8. Apparatus as claimed in claim 6 wherein means are provided for cooperating between said second tool slide and the tire to slightly adjust the position of said second tool silde at its drilling and studding positions to compensate for any misalignment between corresponding lugs on opposite sides of the tire.

9. Apparatus as claimed in claim 8, wherein means are provided for laterally shifting said first and second tool slides with respect to each other in the axial direction of a tire being handled thereby to axially vary the pattern of the studs.

10. Apparatus for applying metal studs to vehicle tire treads including in combination a frame, a generally horizontally disposed shaft supported by and extending from said frame, a tire supporting wheel carried by said shaft and adapted to mount thereon a tire having tire lugs on opposed sides of the tire tread, a drilling and studding head supported by said frame and located above said wheel and movable between a tire loading and a studding operation position relative to a tire adapted to be mounted on said wheel, means for moving said drilling and studding head between said loading and studding operation positions, said head comprising first and second tool slides each having a drilling unit and a studding unit circumferentially in line with each other as oriented with a tire to be studded, means for moving said first and second tool studs relative to said head in a generally tangential direction with respect to a tire to be studded and between first and second positions with said first position locating said drilling units over a tire lug to be studded and with said second position locating said studding units over the same lug, a feeder mechanism carried by said head for moving a tire carried by said wheel into an appropriate position relative to said head, said feeder mechanism comprising a first blade member movable axially into and out of engagement with a lug on the tire, means for moving said feeder mechanism in first and second generally tangential directions with respect to the tire and in said first tangential direction with said blade in engagement with the lug causing the tire to be rotated on said wheel to said appropriate position, adjusting means carried by said second tool slide and comprising second and third blade members movable into and out of engagement with a corresponding lug on the opposite side of the tire tread from said first blade which engagement permits shifts said second tool slide relative to said first tool slide to compensate for any misalignment between corresponding lugs on opposite sides of a tire tread.

11. Apparatus as claimed in claim 10, wherein means are provided for laterally shifting said first and second tool slides with respect to each other in the axial direction of a tire being handled thereby to axially vary the pattern of the studs.

References Cited

UNITED STATES PATENTS 3,048,059   8/1962   Cross _____ 74—819
3,367,015   2/1968   Brosene _____ 29—212

OTHER REFERENCES

Kennametal, Descriptive Bulletin TS–8A, April 1965, 2 pp.

THOMAS S, EAGER, Primary Examiner

U.S. Cl. X.R.

29—212